(12) United States Patent
Doufas

(10) Patent No.: US 8,217,116 B2
(45) Date of Patent: Jul. 10, 2012

(54) POLYPROPYLENE COMPOSITION FOR BURIED STRUCTURES

(75) Inventor: Antonios Doufas, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 425 days.

(21) Appl. No.: 12/503,413

(22) Filed: Jul. 15, 2009

(65) Prior Publication Data

US 2011/0014407 A1    Jan. 20, 2011

(51) Int. Cl.
*C08F 8/00* (2006.01)
*C08L 23/00* (2006.01)
*C08L 23/10* (2006.01)

(52) U.S. Cl. .............................. 525/191; 525/240

(58) Field of Classification Search ............ 525/191, 525/240
See application file for complete search history.

(56) References Cited

U.S. PATENT DOCUMENTS

| | | |
|---|---|---|
| 5,362,782 A | 11/1994 | McCullough, Jr. et al. |
| 5,753,773 A | 5/1998 | Langhauser et al. |
| 5,929,147 A | 7/1999 | Pierick et al. |
| 5,973,078 A | 10/1999 | Pinoca et al. |
| 6,156,844 A | 12/2000 | Hashimoto et al. |
| 6,187,402 B1 | 2/2001 | Ek et al. |
| 6,221,974 B1 | 4/2001 | Harkonen et al. |
| 6,300,415 B1 | 10/2001 | Okayama et al. |
| 6,433,087 B1 | 8/2002 | Ebner et al. |
| 6,503,993 B1 | 1/2003 | Huovinen et al. |
| 6,881,793 B2 | 4/2005 | Sheldon et al. |
| 6,933,347 B2 | 8/2005 | Delaite et al. |
| 6,943,215 B2 | 9/2005 | Stevens et al. |
| 6,986,922 B2 | 1/2006 | Hesse et al. |
| 7,348,381 B2 | 3/2008 | Bodiford et al. |
| 7,368,498 B2 | 5/2008 | Watanabe |
| 7,413,811 B2 | 8/2008 | Dharmarjaran et al. |
| 7,445,827 B2 | 11/2008 | Le et al. |
| 7,476,710 B2 | 1/2009 | Mehta et al. |
| 7,482,406 B2 * | 1/2009 | News et al. .......... 525/240 |
| 2004/0242784 A1 | 12/2004 | Tau et al. |
| 2006/0020067 A1 | 1/2006 | Brant et al. |
| 2006/0089417 A1 | 4/2006 | Hisayama et al. |
| 2006/0089459 A1 | 4/2006 | Tominaga et al. |
| 2006/0167141 A1 | 7/2006 | Dolle et al. |
| 2006/0183860 A1 | 8/2006 | Mehta et al. |
| 2006/0189744 A1 | 8/2006 | Tse et al. |
| 2006/0189763 A1 | 8/2006 | Yang et al. |
| 2006/0211812 A1 | 9/2006 | Natsuyama et al. |
| 2006/0293455 A1 | 12/2006 | Jiang et al. |
| 2006/0293462 A1 | 12/2006 | Jacob et al. |
| 2006/0293471 A1 | 12/2006 | Minami et al. |
| 2007/0117932 A1 | 5/2007 | DePalo et al. |
| 2007/0238828 A1 | 10/2007 | Matsuki et al. |
| 2007/0265398 A1 | 11/2007 | de Palo et al. |
| 2008/0214704 A1 | 9/2008 | Harjuntausta et al. |
| 2008/0227919 A9 | 9/2008 | Li et al. |
| 2008/0257482 A1 | 10/2008 | Jeruzal et al. |
| 2010/0177272 A1 * | 7/2010 | Arthur et al. .......... 349/147 |

FOREIGN PATENT DOCUMENTS

| | | |
|---|---|---|
| EP | 1772487 | 10/2008 |
| WO | WO 2008/014893 | 2/2008 |

OTHER PUBLICATIONS

International Search Report, PCT/US 10/41984.

* cited by examiner

*Primary Examiner* — Nathan M Nutter
(74) *Attorney, Agent, or Firm* — Duane Morris LLP

(57) ABSTRACT

The present disclosure describes a polypropylene resin composition useful for the preparation of buried structures such as corrugated, non-pressure pipe.

16 Claims, 12 Drawing Sheets

Figure 1

| | II | VII | VIII | IX | X | XI | XII | XIII | XIV | XV | XVI[1] |
|---|---|---|---|---|---|---|---|---|---|---|---|
| MFR, dg/min (ASTM 1238) | 0.39 | 0.31 | 0.38 | 0.50 | 0.55 | 0.39 | 0.39 | 0.39 | 0.30 | 0.30 | 0.33 |
| Wt. % Xylene Insoluble Fraction (Composition) | 89.3 | 88.2 | 88.9 | 88.7 | 88.6 | 88.7 | 88.1 | 88.4 | 91.4 | 88.7 | 91.3 |
| Wt. % Xylene Soluble Fraction (Composition) | 10.7 | 11.8 | 11.1 | 11.3 | 11.4 | 11.3 | 11.9 | 11.6 | 8.60 | 11.3 | 8.7 |
| Wt. % Xylene Soluble Fraction (Propylene Polymer) | 2.55 | 1.61 | 2.30 | 2.53 | 2.28 | 2.53 | 2.53 | 2.53 | 1.50 | 1.61 | 2.16 |
| % weight $C_2$ in Xylene Soluble Fraction | 36.7 | 38.7 | 36.8 | 37.0 | 39.1 | 37.2 | 36.8 | 35.8 | 37.1 | 37.8 | 32.9 |
| Total $C_2$ (wt. % in composition) | 6.50 | 7.50 | 6.80 | 6.40 | 7.40 | 6.90 | 6.96 | 6.50 | 4.60 | 6.4 | 4.87 |
| Polydispersity Index @ 200 °C (composition) | 3.30 | 3.87 | 3.13 | 3.13 | 3.03 | 3.36 | 3.35 | 3.16 | 3.57 | 3.70 | 3.21 |
| Polydispersity Index @ 200 °C (propylene polymer) | 3.50 | 3.90 | N/A | 3.70 | 2.90 | 3.50 | 3.50 | 3.50 | 3.50 | 3.66 | 3.50 |
| Nucleated | Yes | No | No | Yes | No | Yes | Yes | Yes | Yes | No | Yes |

1 = Prepared with propylene polymer sample IV;

Figure 2

| ASTM # | Phys. Prop. | II | VII | VIII | IX | X | XI | XII | XIII | XIV | XV | XVI | HDPE |
|---|---|---|---|---|---|---|---|---|---|---|---|---|---|
| D790 | 1% Secant Flex. Mod. (kpsi) | 197 | 200 | 175.7 | 192.2 | 184.9 | 195.2 | 193.1 | 197.3 | 229 | 199 | 195 | 127.6 |
| D256 | Izod Impact @ RT (ft-lb/in) | 100% NB* | 100% NB | 100% NB | 100% NB | 100% NB | 100% NB | 100% NB | 100% NB | 100% NB | 100% NB | 100% NB | 2.47 PB† |
| D256 | Izod -4 °C (ft-lb/in) | 5.08 PB | 3.3 PB | N/A | N/A | N/A | N/A | N/A | 5.08 PB | 2.61 PB | 2.60 PB | 2.14 PB | 1.58 PB |
| D256 | Izod -20 °C (ft-lb/in) | 1.39 CB‡ | N/A | N/A | N/A | N/A | N/A | N/A | 1.39 CB | 1.39 CB | N/A | 1.18 CB | 1.36 CB |
| D638 | Yield Stress (psi) | 4261 | 4198 | 4012 | 4153 | 3950 | 4223 | 4256 | 4207 | 4570 | 4255 | 4397 | 4638 |
| D638 | % Strain @ Yield Point | 11.70 | 12.1 | 12.9 | 10.1 | 10.6 | 10.2 | 10.7 | 11.1 | 7.7 | 10.8 | 10 | 11.5 |
| D638 | Tangent Tensile Modulus (kpsi) | 181 | 211 | 180 | 219 | 193 | 225 | 219 | 198 | 253 | 220 | 227 | 211 |
| D6992 | 50-year creep modulus (psi) (SIM @ 500 psi) | 32,963 | 29,155 | 24,936 | 34,451 | 21,723 | N/A | N/A | 30,878 | 42,429 | 28476 | 46,810 | 22,723 |
| D6992 | 50-year % creep strain (SIM @ 500 psi) | 1.52 | 1.72 | 2.01 | 1.45 | 2.2 | N/A | N/A | 1.62 | 1.18 | 1.76 | 1.07 | 2.2 |

*NB = non-break
†PB = partial break
‡CB = complete break

Figure 3

| ASTM # | Phys. Prop. | II | VII | VIII | IX | X | XI | XII | XIII | XIV | XV | XVI | HDPE |
|---|---|---|---|---|---|---|---|---|---|---|---|---|---|
| D6992 | 50-year creep rupture strength (psi) (SIM) | 1172 | >1,000 | >1,000 | >1,000 | >1,000 | N/A | N/A | >1,000 | >1,000 | >1,000 | >1,000 | >1,000 |
| D6992 | 50-year % creep strain @ 1000 psi (SIM) | 4.92 | 6.84 | 6.68 | 4.6 | 8.62 | N/A | N/A | 4.97 | 3.45 | 6.63 | 4.25 | 5.84 |
| D3763 | Instrumented Impact (IIMP, Ceast) Total Energy @ -20 °C (ft-lbs) | 37.1 | 38.6 | N/A | 36.5 | N/A | N/A | N/A | N/A | 9.0 | 36.0 | 23.7 | 29.4 |
| D3763 | IIMP Energy @ Max Load @ -20 °C (ft-lbs) | 22.3 | 22.4 | N/A | 21.6 | N/A | N/A | N/A | N/A | 6.0 | 21.2 | 20 | 19.3 |
| D3763 | Instrumented Impact (IIMP, Ceast) Total Energy @ -29 °C (ft-lbs) | N/A | N/A | 38 | 34.2 | N/A | N/A | N/A | N/A | N/A | N/A | N/A | 28.6 |
| D3763 | IIMP Energy @ Max Load @ -29 °C (ft-lbs) | N/A | N/A | 23.1 | 20.5 | N/A | N/A | N/A | N/A | N/A | N/A | N/A | 19.1 |

Figure 4

| ASTM # | Phys. Prop. | II | VII | VIII | IX | X | XI | XII | XIII | XIV | XV | XVI | HDPE |
|---|---|---|---|---|---|---|---|---|---|---|---|---|---|
| D3763 | IIMP Total Energy @ -4 °C (ft-lbs) | 33.1 | 36.4 | 33.6 | 32.2 | N/A | N/A | 33.3 | 33.1 | 21.1 | 31.9 | 36.6 | 26.4 |
| D3763 | IIMP Energy @ Max Load @ -4 °C (ft-lbs) | 19.2 | 16.1 | 19.2 | 18.2 | N/A | N/A | 18.9 | 19.1 | 15.9 | 18.1 | 22.6 | 18.6 |
| D3763 | IIMP Total Energy @ RT (ft-lbs) | 28.2 | 28.7 | N/A | N/A | N/A | N/A | N/A | N/A | N/A | N/A | N/A | N/A |
| D3763 | IIMP Energy @ Max Load @ RT (ft-lbs) | 15.9 | 16.1 | 15.5 | 16 | N/A | 16.3 | 16.7 | 15.9 | 17.8 | 16.3 | 17.6 | 15.9 |
| ASTM D648 | Heat Distortion Temperature DTUL (°C) @ 66 psi | 95.00 | 83.3 | 84.9 | 100.1 | N/A | N/A | N/A | N/A | 103.5 | 83.5 | 95.6 | 61.1 |

POLYPROPYLENE COMPOSITION FOR BURIED STRUCTURES

BACKGROUND

There is a substantial need for non-pressure pipe useful for the transport of rainwater and sewage away from residential and commercial properties. Typically, pipes of this nature are buried underground and are made of clay or metal. Each of these materials, though, is susceptible to the environment in which it resides. Clay pipes, for example, often contain junctions that allow the infiltration of roots or other materials that may clog the pipe or otherwise damage the piping system over time. Similarly, metal pipes are susceptible to corrosion.

In recent years, these issues have been addressed to some extent via the adoption of pipes made of materials such as polyvinyl chloride and polyethylene (HDPE). Even more recently, non-pressure pipe manufacturers have been employing polypropylene as a substitute material. See, e.g., U.S. Pat. No. 6,933,347 which discloses a polypropylene pipe comprising an impact copolymer; U.S. Pat. No. 6,433,087 which also discloses a pipe comprising an impact copolymer, and United States Patent Publication 2007/0117932 which teaches a heterophasic polyolefin composition comprising an elastomeric polymer in combination with a crystalline polymer having a broad molecular weight distribution.

The widespread adoption of polypropylene non-pressure pipes in the United States has, however, been slow. Specifically, although polypropylene provides an affordable alternative to polyethylene, and is easily fused to provide essentially seamless pipes of variable length, the performance characteristics of the pipes produced from presently available resins have not been ideal. Moreover, presently available polypropylene resins suitable for manufacturing pipe are difficult to process.

For example, polypropylene pipes made from resins that are currently available may deform if buried too deeply, impeding the flow of the rain water or sewage being transported. These failures are believed to be due, in part, to an industry wide focus on developing resins having specific flexural moduli and notch impact strengths. These properties, though, do not accurately predict long term performance of buried polypropylene structures as both flexural moduli and notch impact strength relate only to short term performance.

Thus, what is needed is a resin exhibiting good long term performance for use in buried structures, particularly corrugated non-pressure pipe. In particular, it has been found that what is needed is a resin exhibiting good long term creep performance, good creep rupture strength, and a good balance of stiffness and impact resistance. The present disclosure provides such a resin.

BRIEF SUMMARY OF THE INVENTION

The present disclosure is directed to a polypropylene impact copolymer having superior processability, stiffness-impact balance, and superior long-term creep properties for the solid polymer.

In one embodiment the polypropylene composition comprises about 83 to about 95 weight percent of a xylene insoluble fraction comprising a xylene insoluble portion of a propylene polymer. The propylene polymer can have an mmmm of from about 88 to about 95 percent; an Nm of from about 55 to about 102; a xylene solubles content of from about 1 to about 5%; and a polydispersity index of 2.5 to 6. The polypropylene composition further includes about 5 to about 17 weight percent of a xylene soluble fraction comprising a xylene soluble portion of a copolymer of propylene and ethylene. The xylene soluble fraction can have about 20 to about 55 weight percent ethylene. The composition can have about 1.3 to about 19 weight percent total ethylene, a polydispersity index of from about 2.5 to about 4.5, and a 50-year creep strain of less than about 8% at 1000 psi at 23° C. without creep rupture.

In a sub-embodiment, the propylene polymer can have an mmmm of about 93, an Nm of about 72, and a polydispersity index of about 3.5. The xylene soluble fraction can have about 36 to about 37 weight percent ethylene. The composition can have about 6 to about 7 weight percent total ethylene, and a polydispersity index of about 3.3.

In one sub-embodiment, the composition can include a nucleator.

In another sub-embodiment, the composition can have a melt flow rate of less than about 20 g/10 min. In certain sub-embodiments, the melt flow can be less than about 1 g/10 min.

In certain sub-embodiments, the composition can have a 1% secant flexular modulus of about 170,000 to about 230,000 psi.

In certain sub-embodiments, the composition can have a 50-year creep modulus of at least about 24,000 psi at 23° C. and 500 psi.

In another sub-embodiment, the composition can include at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

In another sub-embodiment, the composition can have a total energy during instrumented impact at −20° C. of at least about 20 foot pounds.

The present disclosure also provides mono- or multi-layer pipes, pipe fittings, pipe junctions, tubes, or hoses comprising a polypropylene composition. In one embodiment, the mono- or multi-layer pipes, pipe fittings, pipe junctions, tubes, or hoses, the polypropylene composition can comprise about 83 to about 95 weight percent of a xylene insoluble fraction comprising a xylene insoluble portion of a propylene polymer. The propylene polymer can have an mmmm of from about 88 to about 95 percent; an Nm of from about 55 to about 102; a xylene solubles content of from about 1 to about 5%; and a polydispersity index of 2.5 to 6. The polypropylene composition further includes about 5 to about 17 weight percent of a xylene soluble fraction comprising a xylene soluble portion of a copolymer of propylene and ethylene. The xylene soluble fraction can have about 20 to about 55 weight percent ethylene. The composition can have about 1.3 to about 19 weight percent total ethylene, a polydispersity index of from about 2.5 to about 4.5, and a 50-year creep strain of less than about 8% at 1000 psi at 23° C. without creep rupture.

In a sub-embodiment, the propylene polymer can have an mmmm of about 93, an Nm of about 72, and a polydispersity index of about 3.5. The xylene soluble fraction can have about 36 to about 37 weight percent ethylene. The composition can have about 6 to about 7 weight percent total ethylene, and a polydispersity index of about 3.3.

In one sub-embodiment, the composition can include a nucleator.

In certain sub-embodiments, the composition can have a 1% secant flexular modulus of about 170,000 to about 230,000 psi.

In certain sub-embodiments, the composition can have a 50-year creep modulus of at least about 24,000 psi at 23° C. and 500 psi.

In another sub-embodiment, the composition can include at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

In another sub-embodiment, the composition can have a total energy during instrumented impact at −20° C. of at least about 20 foot pounds.

The present disclosure further provides a method for preparing a composition. The composition can comprise about 83 to about 95 weight percent of a xylene insoluble fraction comprising a xylene insoluble portion of a propylene polymer. The propylene polymer can have an mmmm of from about 88 to about 95 percent; an Nm of from about 55 to about 102; a xylene solubles content of from about 1 to about 5%; and a polydispersity index of 2.5 to 6. The composition further includes about 5 to about 17 weight percent of a xylene soluble fraction comprising a xylene soluble portion of a copolymer of propylene and ethylene. The xylene soluble fraction can have about 20 to about 55 weight percent ethylene. The composition can have about 1.3 to about 19 weight percent total ethylene, a polydispersity index of from about 2.5 to about 4.5, and a 50-year creep strain of less than about 8% at 1000 psi at 23° C. without creep rupture.

The method for preparing this polypropylene composition can comprise feeding propylene and hydrogen into a first stage including at least one homopolymerization reactor. The method further includes polymerizing propylene in said first stage at a first temperature and pressure in the presence of a catalyst, cocatalyst, and an electron donor to produce a first product. The method of preparation further includes transferring said first product, catalyst, cocatalyst, and electron donor to a second stage including at least one copolymerization reactor. The polymerization process further includes copolymerizing propylene and ethylene at a second temperature and pressure in the presence of the first product to form said composition.

In a sub-embodiment of the above described method, the propylene polymer can have an mmmm of about 93, an Nm of about 72, and a polydispersity index of about 3.5. The xylene soluble fraction can have about 36 to about 37 weight percent ethylene, and the composition can have about 6 to about 7 weight percent total ethylene and a polydispersity index of about 3.3.

In a further sub-embodiment of the above described method, the method includes adding a nucleator.

In another sub-embodiment of the method, the first temperature can be about 75° C., the first pressure can be about 42 kg/cm², the second temperature can be at least about 70° C., and the second pressure can be at least about 9 kg/cm².

In still another sub-embodiment, the method can include transferring the composition to an extruder; optionally adding an additive to the composition in the extruder; and extruding and pelletizing the compound and optional additive.

The present disclosure further provides a polypropylene composition, comprising about 83 to about 95 weight percent of a xylene insoluble fraction comprising a xylene insoluble portion of a propylene polymer. The propylene polymer can have an mmmm of from about 88 to less than about 96 percent; an Nm of from about 103 to about 120; a xylene solubles content of from about 1 to about 5%; and a polydispersity index of 2.5 to 6. The polypropylene composition further includes about 5 to about 17 weight percent of a xylene soluble fraction comprising a xylene soluble portion of a copolymer of propylene and ethylene. The xylene soluble fraction can have about 20 to about 55 weight percent ethylene. The composition can further have about 1.3 to about 19 weight percent total ethylene; a polydispersity index of from about 2.5 to about 4.5; and a 50-year creep strain of less than about 8% at 1000 psi at 23° C. without creep rupture.

In one sub-embodiment, the xylene insoluble fraction can have an mmmm of about 95, an Nm of about 112, and a polydispersity index of about 3.9. The xylene soluble fraction can have about 38 to about 39 weight percent ethylene. The composition can have about 7 to about 8 weight percent total ethylene and a polydispersity index of about 3.8 to about 3.9.

In another sub-embodiment, the composition can have a melt flow rate of less than about 20 g/10 min.

In still another sub-embodiment, the composition can have a melt flow of less than about 1 g/10 min.

In certain sub-embodiments, the composition can have a 1% secant flexular modulus of about 170,000 to about 230,000 psi.

In certain sub-embodiments, the composition can have a 50-year creep modulus of at least about 24,000 psi at 23° C. and 500 psi.

In another sub-embodiment, the composition can include at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

In another sub-embodiment, the composition can have a total energy during instrumented impact at −20° C. of at least about 20 foot pounds.

In another sub-embodiment, the composition can have an intrinsic viscosity ratio of copolymer to propylene polymer of about 1 to about 1.8.

As noted elsewhere herein, the present disclosure also provides mono- or multi-layer pipes, pipe fittings, pipe junctions, tubes, or hoses comprising a polypropylene composition. In one embodiment, the composition can comprise about 83 to about 95 weight percent of a xylene insoluble fraction comprising a xylene insoluble portion of a propylene polymer, said propylene polymer having an mmmm of from about 88 to less than about 96 percent; an Nm of from about 103 to about 120; a xylene solubles content of from about 1 to about 5%; and a polydispersity index of 2.5 to 6. The composition can further comprise about 5 to about 17 weight percent of a xylene soluble fraction comprising a xylene soluble portion of a copolymer of propylene and ethylene, said xylene soluble fraction having about 20 to about 55 weight percent ethylene. The can have about 1.3 to about 19 weight percent total ethylene, a polydispersity index of from about 2.5 to about 4.5, and a 50-year creep strain of less than about 8% at 1000 psi at 23° C. without creep rupture.

In one sub-embodiment, the propylene polymer can have an mmmm of about 95, an Nm of about 112, and a polydispersity index of about 3.9. The xylene soluble fraction can have about 38 to about 39 weight percent ethylene. The composition can have about 7 to about 8 weight percent total ethylene and a polydispersity index of about 3.8 to about 3.9.

In a further sub-embodiment, the composition can have a 50-year creep modulus of at least about 24,000 psi at 23° C. and 500 psi.

In another sub-embodiment, the composition can have a 1% secant flexular modulus of about 170,000 to about 230,000 psi.

In still another sub-embodiment, the polypropylene composition can further comprise at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

In another sub-embodiment, the composition can have an intrinsic viscosity ratio of copolymer to homopolymer of about 1 to about 1.8

The present disclosure further includes a method for preparing a composition that can comprise about 83 to about 95 weight percent of a xylene insoluble fraction comprising a xylene insoluble portion of a propylene polymer, said propylene polymer having an mmmm of from about 88 to less than about 96 percent; an Nm of from about 103 to about 120; a xylene solubles content of from about 1 to about 5%; and a polydispersity index of 2.5 to 6. The composition can further comprise about 5 to about 17 weight percent of a xylene soluble fraction comprising a xylene soluble portion of a copolymer of propylene and ethylene, said xylene soluble fraction having about 20 to about 55 weight percent ethylene. The can have about 1.3 to about 19 weight percent total ethylene, a polydispersity index of from about 2.5 to about 4.5, and a 50-year creep strain of less than about 8% at 1000 psi at 23° C. without creep rupture. The method includes feeding propylene and hydrogen into a first stage including at least one homopolymerization reactor; polymerizing the propylene in the first stage at a first temperature and pressure in the presence of a catalyst, cocatalyst, and an electron donor to produce a first product; transferring the first product, catalyst, cocatalyst, and electron donor to a second stage including at least one copolymerization reactor; and copolymerizing propylene and ethylene at a second temperature and pressure in the presence of the first product.

In one sub-embodiment, the propylene polymer can have an mmmm of about 95, an Nm of about 112, and a polydispersity index of about 3.9. The xylene soluble fraction can have about 38 to about 39 weight percent ethylene. The composition can have about 7 to about 8 weight percent total ethylene and a polydispersity index of about 3.8 to about 3.9.

In another sub-embodiment, the composition can have an intrinsic viscosity ratio of copolymer to homopolymer of about 1 to about 1.8

In a further sub-embodiment, the first temperature can be about 75° C., the first pressure can be about 42 kg/cm$^2$, the second temperature can be at least about 70° C., and the second pressure can be at least about 9 kg/cm$^2$.

Another method for making the composition described herein is also provided. This method may include mixing a propylene polymer having an mmmm of from about 88 to about 95 percent; an Nm of from about 55 to about 102; a xylene solubles content of from about 1 to about 5%; and a polydispersity index of 2.5 to 6, with an ethylene propylene copolymer. The method may further include optionally adding an additive to the extruder. The method also includes extruding and pelletizing the composition.

The present disclosure further recites an article comprising any one of the composition as described herein wherein the article is prepared via extrusion, injection molding, compression molding, blow molding, or thermoforming.

The present disclosure further includes another method of preparing a composition disclosed herein. This can include mixing a propylene polymer having an mmmm of from about 88 to about 96 percent; an Nm of from about 103 to about 120; a xylene solubles content of from about 1 to about 5%; and a polydispersity index of 2.5 to 6, with an ethylene propylene copolymer, in an extruder to form said composition; optionally adding an additive to the extruder; and extruding and pelletizing the composition.

DRAWINGS

For the purpose of illustrating the resin described herein, there are depicted in the drawings certain embodiments of the resin in various tables and graphs. However, the resin described herein is not limited to the precise arrangements and instrumentalities of the embodiments depicted in the drawings.

FIG. 1 is a table of various compositional properties of representative polymers of the invention.

FIG. 2 is a table detailing the performance characteristics of various polymers of the invention as well as comparative examples.

FIG. 3 is a table detailing the performance characteristics of various polymers of the invention as well as comparative examples.

FIG. 4 is a table detailing the performance characteristics of various polymers of the invention as well as comparative examples.

DETAILED DESCRIPTION OF THE INVENTION

Definitions & Abbreviations

Figure 5:
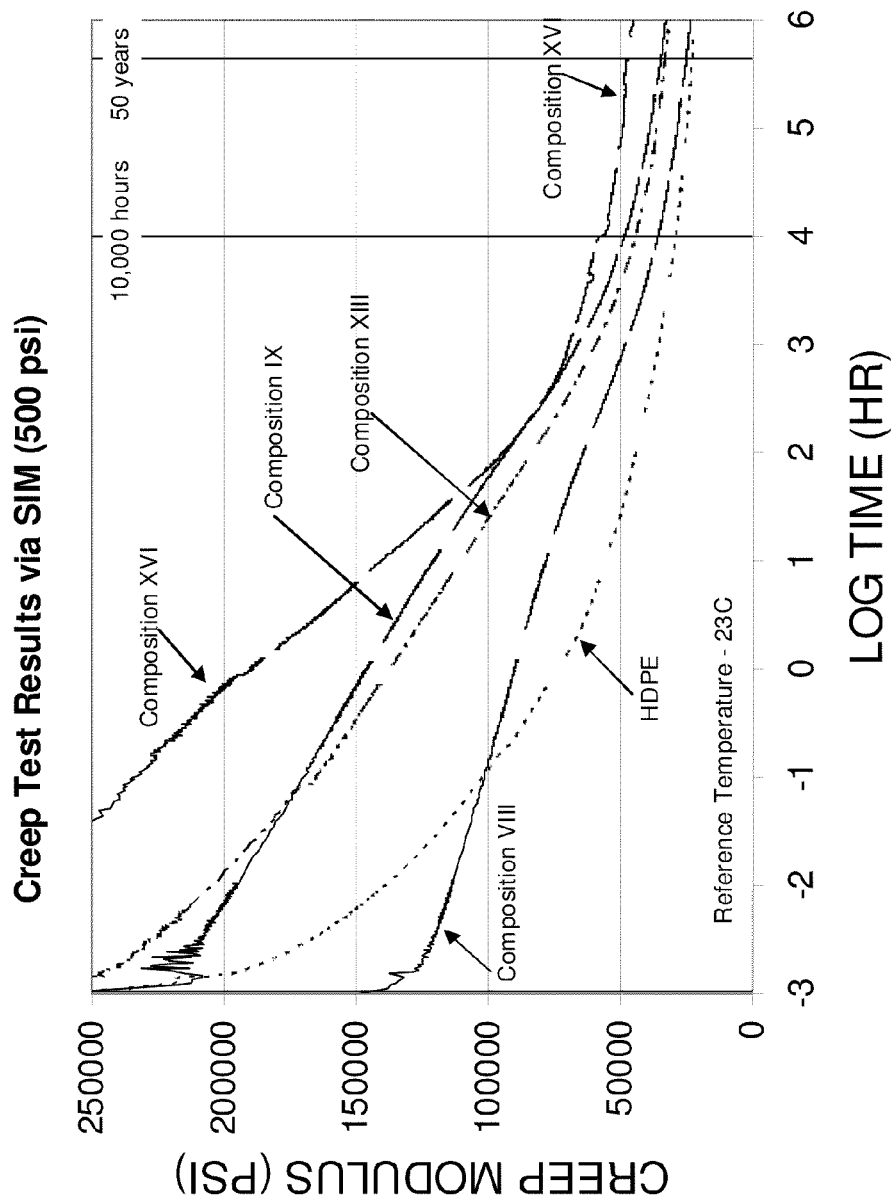
FIG. 5 is a graph depicting the Creep Modulus of various compositions of the invention and several comparative examples at 500 PSI.
Figure 6:
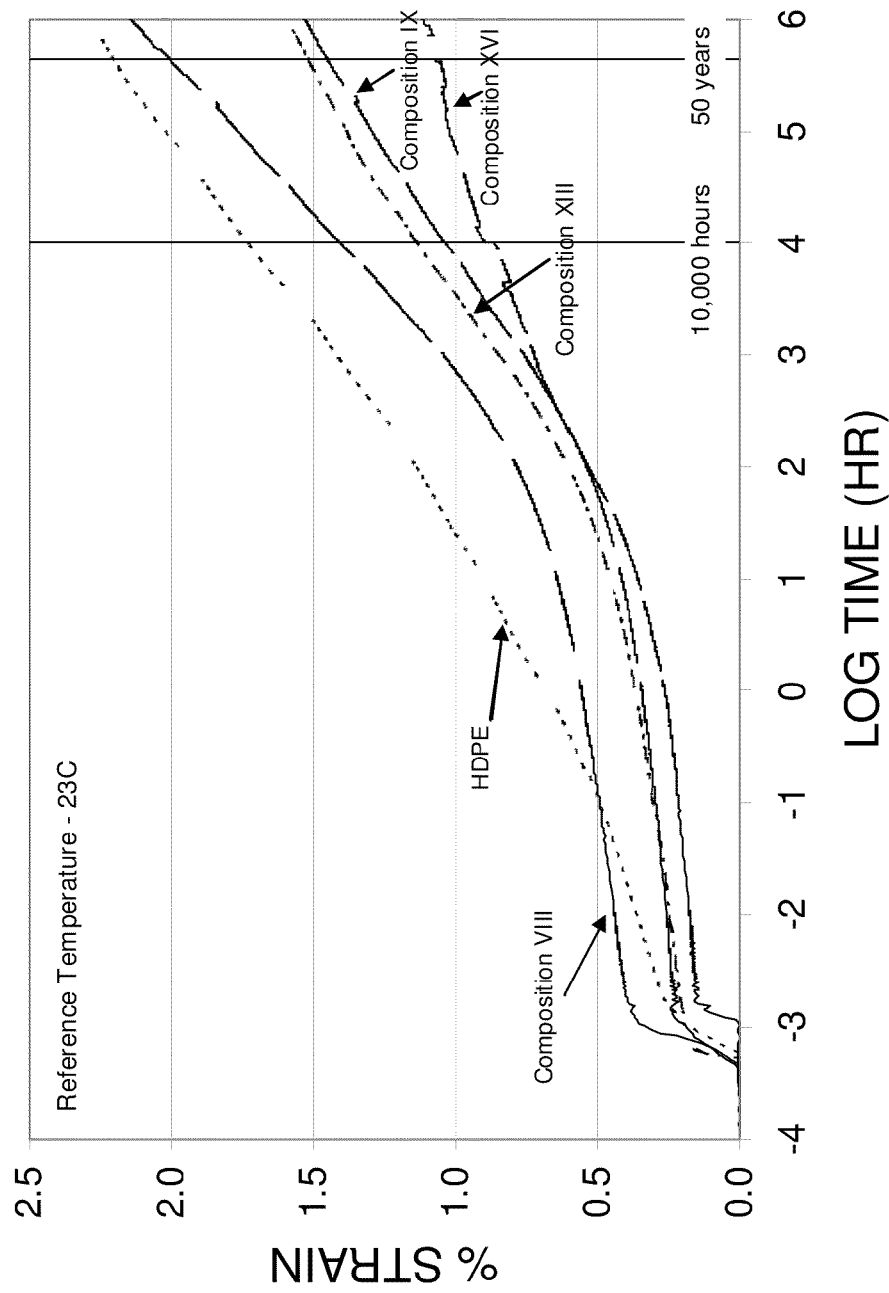
FIG. 6 is a graph depicting the Creep Strain (%) of various compositions of the invention and several comparative examples at 500 PSI.
Figure 7:
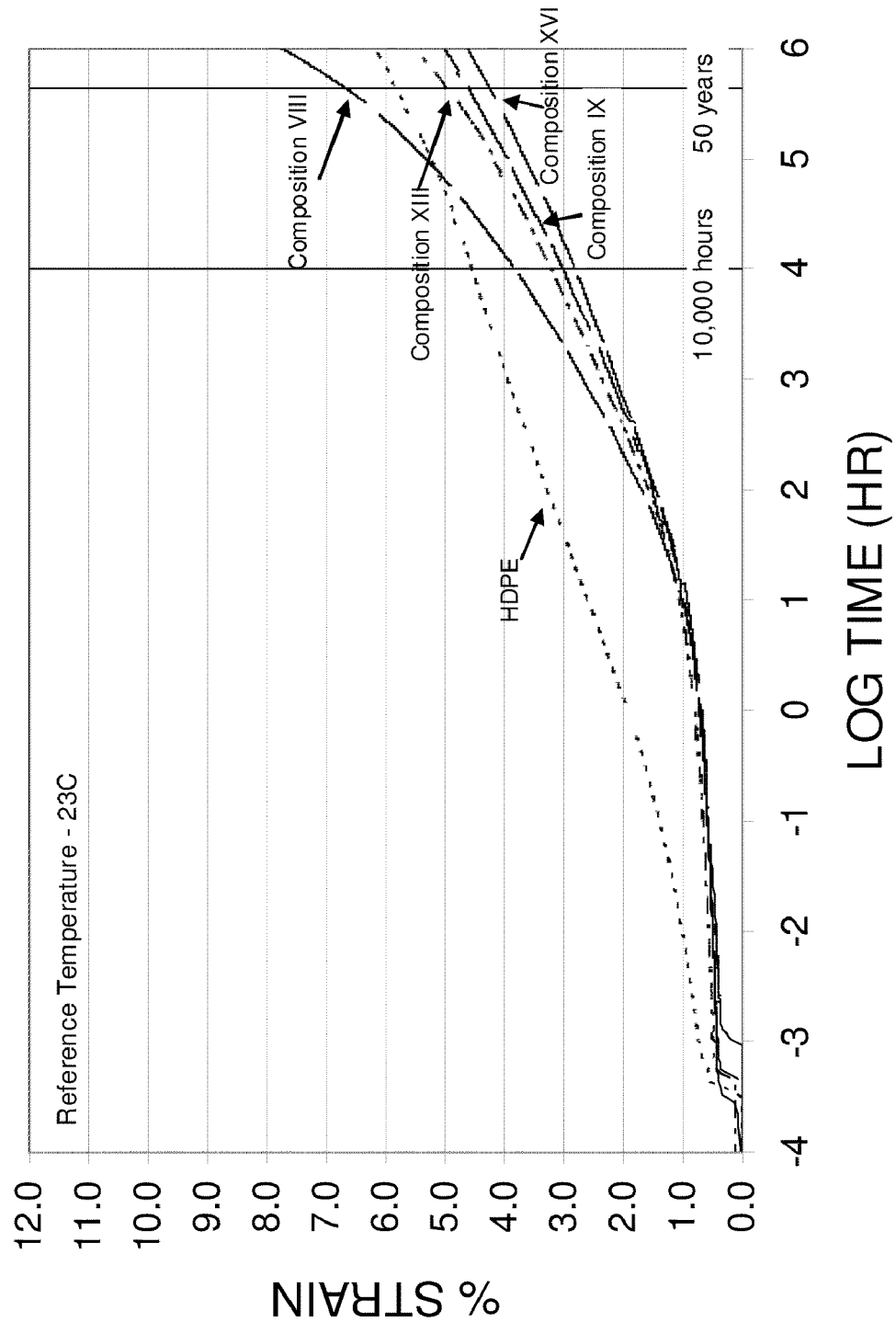
FIG. 7 is a graph depicting the Creep Modulus of various compositions of the invention and several comparative examples at 1000 PSI.
Figure 8:
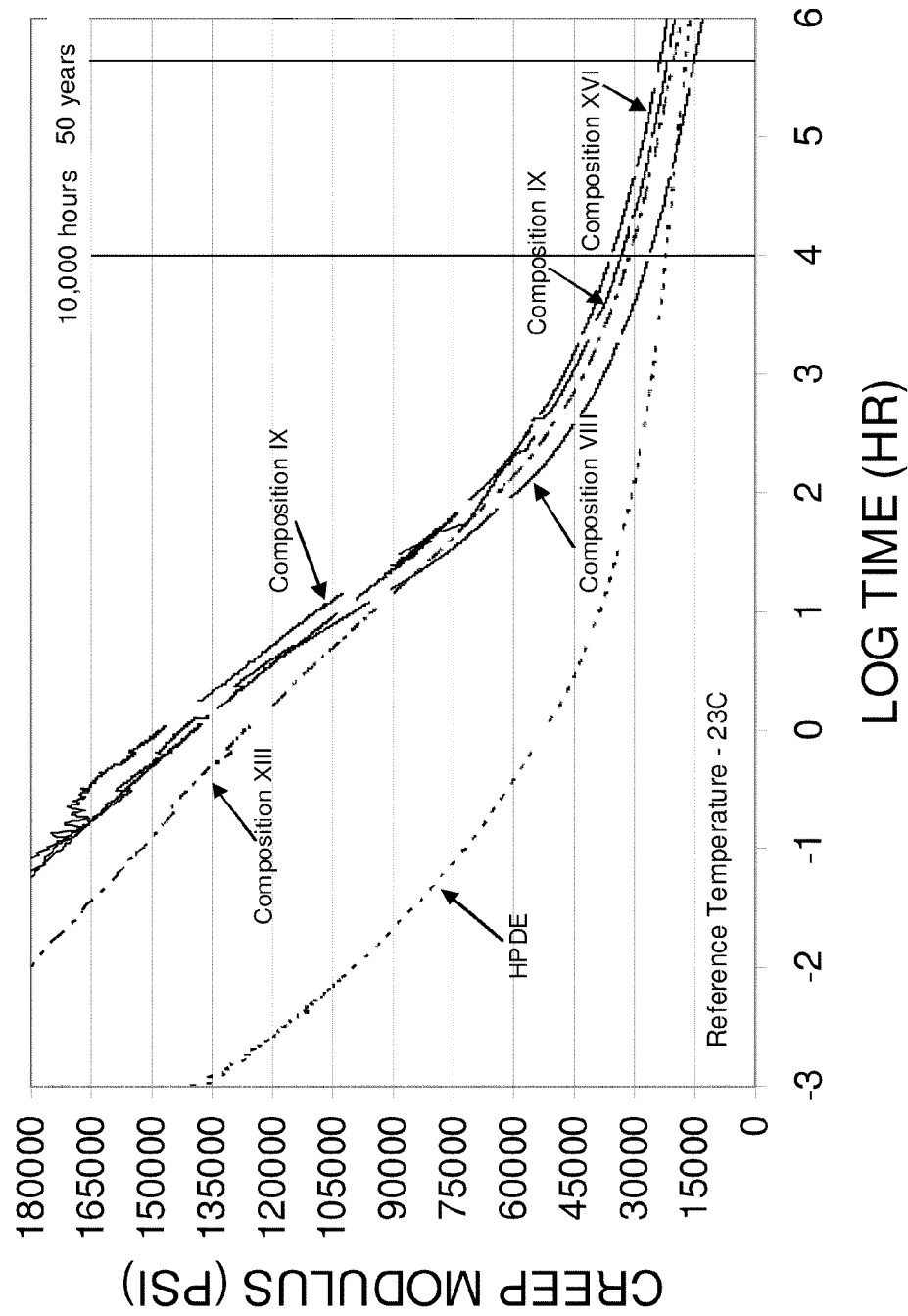
FIG. 8 is a graph depicting the Creep Strain (%) of various compositions of the invention and several comparative examples at 500 PSI.

In accordance with this detailed description, the following abbreviations and definitions apply. It must be noted that as used herein, the singular forms "a", "an", and "the" include plural referents unless the context clearly dictates otherwise. Thus, for example, reference to "a resin" includes a plurality of such resins and reference to "the resin" includes reference to one or more resins and equivalents thereof known to those skilled in the art, and so forth.

As used herein the phrase "propylene polymer" refers to a propylene homopolymer or to an ethylene propylene random copolymer having, in certain embodiments, less than 1.5 weight percent ethylene, and in other embodiments, less than 1 weight percent ethylene. In the context of an impact copolymer, the propylene polymer may be referred to as the "matrix."

Unless defined otherwise, all technical and scientific terms used herein have the same meaning as commonly understood by one of ordinary skill in the art.

Ranges are provided in various locations throughout this specification. For any given range in the present specification, every whole integer therein is deemed to be part of that range, as is every hundredth and thousandth of an integer, such that a range of from, for example, 1 to 2 includes at least 1.000, 1.001, 1.002, 1.003, 1.004, 1.005, 1.006, 1.007, 1.008, 1.009, 1.010, 1.011, etc. through to 2, unless otherwise provided.

It is generally accepted in the art that there is a direct correlation between the isotacticity of the matrix of an impact copolymer and the stiffness of the total impact copolymer. As a result, it is generally accepted that the higher the isotacticity of the matrix, the higher the stiffness in the total polymer. It is also generally appreciated that a broad molecular weight distribution in the matrix portion of an impact copolymer, such as the propylene polymer portion of the impact copolymer, correlates to a polymer having enhanced stiffness. Good long term creep resistance as measured by creep modulus, % creep strain, and creep rupture strength, are likewise generally believed to be associated with high stiffness. Thus, a person of ordinary skill in the art attempting to design an impact copolymer with outstanding long term creep properties, would likely prepare an impact copolymer wherein the matrix of the impact copolymer has a high isotacticity and a broad molecular weight distribution.

It has now been surprisingly discovered, though, that the matrix of a heterophasic impact copolymer used for non-pressure pipes does not need to be highly isotactic to achieve excellent long-term (50-100 year) creep resistance. In particular, the data provided herein demonstrates that an impact copolymer comprising a matrix having an "mmmm" of less than about 96 percent, and in certain embodiments, less than about 95 percent, can have outstanding long term creep resistance.

The fact that an impact copolymer having a low or medium isotacticity matrix provides a resin having excellent long-term creep performance is both counterintuitive and unexpected. The unexpected nature of these results is made even more surprising by the fact that experimentation has shown that a matrix having a relatively narrow molecular weight distribution, which results in a less stiff resin, results in a product with excellent long term creep resistance, too.

In addition to the above, the impact copolymer described herein has superior ductility at temperatures at least as low as −29° C. The combination of excellent long term creep resistance and outstanding cold temperature impact strength for the composition described herein is highly advantageous and desirable for use in buried structures, such as non-pressure pipe.

The Components of the Composition

The composition of the present invention is an impact copolymer. An impact copolymer includes both a matrix and an ethylene propylene copolymer. Particularly for in-reactor produced materials, the percent content of the matrix and ethylene propylene copolymer are difficult to ascertain directly. As a result of the difficulties associated with direct measurement, polymer chemists of ordinary skill in the art frequently report the weight percentages of the xylene insolubles and solubles content of an impact copolymer. These values are easily measured and provide a rough approximation of the weight percent content of the matrix and ethylene propylene copolymer, respectively.

For the composition described herein, the xylene insoluble fraction comprises, amongst other components, the xylene insoluble portion of the propylene polymer. The xylene insoluble fraction makes up anywhere from about 83 to about 95 weight percent of the composition. In certain embodiments, the xylene insoluble fraction makes up from about 84 to about 89 weight percent of the composition. The weight percent of the xylene insoluble fraction in the composition can be determined by measuring the weight percent of the xylene solubles fraction of the composition, and subtracting the resulting value from 100.

The weight percent of the xylene soluble fraction in the composition is measured by adding 2 g of the composition to 200 ml of o-xylene (stabilized with AO-1010) in a flask equipped with a water cooled condenser. The mixture is then heated to reflux (about 140° C.) under a nitrogen purge and allowed to stir for about 30 minutes. Subsequently, the temperature is lowered to about 100° C. for about 30 minutes at which point the polymer is thoroughly dissolved in o-xylene.

The heat source is then removed and any condensate remaining in the condenser is allowed to drain into the flask (approximately 5 minutes). The condenser is removed and the flask is placed into a thermostatically controlled water bath maintained at 25° C.±0.5° C. for 1 hour. During this time, a precipitate forms.

The flask is then removed from water bath and the flask's contents are filtered through a Whatman 114V (Qualitative Wet-Strengthened) filter paper. The filtrate is collected and adjusted to the original starting volume of 200 ml. After stirring, a 50 ml aliquot of the diluted filtrate is collected with a volumetric pipette. The aliquot is subsequently transferred to a tared stainless steel beaker.

The beaker is placed into a steam bath and the solvent contained in the aliquot is evaporated. The beaker is then placed in a vacuum oven for 1 hr at 80° C. to ensure that any remaining solvent is fully evaporated. Finally, the beaker is removed from the vacuum oven, allowed to cool to room temperature under ambient conditions for 1 hour, and then weighed. The weight of the contents of the flask are determined by subtracting the weight of the tared beaker from the measured weight of beaker with the dried soluble fraction. The weight percent xylene soluble fraction (% XS) of the composition can thus be calculated as follows:

$$\% \ XS = 100 * \left( \frac{\text{Weight of Solid Sample Contained in Aliquot}}{\text{Starting Sample Weight}} \right) * \left( \frac{\text{Total Volume of xylene Used To Dissolve Sample}}{\text{Volume of Aliquot}} \right)$$

Thus, using a 2 g sample of composition, 200 ml of solvent for the initial dissolution, and a 50 ml aliquot, as in the above described example, the % XS=100*(Weight of Solid Sample Contained in Aliquot/2 g)*(200 ml/50 ml) or 200*Weight of Solid Sample Contained in Aliquot.

The Propylene Polymer

The xylene insoluble fraction of the composition described herein comprises, amongst other components, the xylene insoluble portion of the propylene polymer. Regardless of the method used to prepare the composition described herein, the properties of the propylene polymer may be measured directly by sampling propylene polymer from a given reactor prior to blending the propylene polymer with an ethylene propylene copolymer.

The propylene polymer can exhibit an mmmm (meso pentad) content of from about 88 to less than about 96 percent. In certain embodiments, the mmmm can be from about 89 to less than about 95 percent. Percent meso pentad content is measured by $^{13}$C NMR according to Macromolecules, volume 6, no. 6, 1973, p. 925-926. Without wishing to be bound to any particular theory, it is believed that this relatively low isotacticity, in combination with the various other properties described herein, results in a polymer having desirable long term creep properties.

In certain embodiments, the mmmm can be about 92 to less than about 96 percent. In one embodiment, mmmm content can be about 92 percent. In another embodiment, mmmm content can be about 92.8 percent. In another embodiment, mmmm content can be about 92.86 percent. In yet another embodiment, mmmm can be about 95 percent. In another embodiment, mmmm content can be about 95.3 percent. In still another embodiment, mmmm content can be 95.33 percent.

The propylene polymer can have an average Nm [meso sequence (nm) length] of about 55 to about 120. Nm can be measured using $^{13}$C NMR according to the following equation:

$$Nm=2(mm/mr)+1$$

as described in the Bovey, F. *Chain Structure and Conformation of Macromolecules*, New York: Academic Press, 1982, p. 55, wherein "mm" is the molar fraction of isotactic triads and "mr" is the molar fraction of heterotactic (meso-racemic) triads.

In one embodiment, Nm may be about 55 to about 102. In another embodiment, Nm may be about 103 to about 120. In one embodiment, Nm can be about 72. In another embodiment, Nm can be about 72.1. In another embodiment, Nm can be about 112. In another embodiment, Nm can be about 112.2.

The propylene polymer can be further characterized by a xylene soluble and a xylene insoluble fraction. The weight percent of the xylene soluble fraction of the propylene polymer can be measured according to methodology described above for measurement of the weight percent of the xylene soluble fraction of the composition. The xylene soluble fraction of the propylene polymer can be from about 1% to about 5%. Accordingly, the xylene insoluble fraction of the propylene polymer of the composition can be from about 95% to about 99%.

The propylene polymer can be further characterized by an intrinsic viscosity of from about 2.5 to about 6 dl/g. The intrinsic viscosity of the propylene polymer can be measured in tetralin at 135° C. using a Desreux-Bischoff dilution viscometer (Ubbelohde-type) on a 1 g/L solution of the propylene polymer. In one embodiment, the intrinsic viscosity of the propylene polymer can be about 3 dl/g. In another embodiment, the intrinsic viscosity of the propylene polymer can be about 3.4 dl/g. In another embodiment, the intrinsic viscosity of the propylene polymer can be about 3.44 dl/g. In another embodiment the intrinsic viscosity of the propylene polymer can be about 3.5 to about 4 dl/g.

The propylene polymer can be further characterized by a polydispersity index of from about 2.5 to about 6. Polydispersity can be measured according to the crossover modulus method. The crossover modulus method is described in Zeichner, G. R., et al, Proc. Of the $2^{nd}$ World Congress of Chemical Engineering, Montreal, Canada, 1981, as well as in equation 6 as presented in Shroff, R., et al., Applied Polymer Sciences, Vol. 57, 1605-1626, 1995. For the propylene polymer, the polydispersity index is measured via frequency sweep oscillatory shear data at 200° C. This data is generated using an ARES (TA Instruments) controlled strain rheometer using 25 mm parallel plates with a frequency range from 0.1 to 500 rad/s.

In instances where the melt flow rate of the propylene polymer is greater than about 40 g/10 min, polydispersity index cannot be determined by the crossover modulus method due to instrument limitations. Thus, for propylene polymers with melt flows greater than about 40 g/10 min, the modulus separation technique described by H. J. Yoo in "MWD Determination of Ultra High MFR Polypropylene by Melt Rheology", Advances in Polymer Technology, Vol. 13, 201-205, 1994 should be used instead.

Without wishing to be bound to any particular theory, it is believed that this range of narrow molecular weight distributions, in combination with the other properties described herein, surprisingly results in a composition having enhanced creep properties. In certain embodiments, the polydispersity index of the propylene polymer is from about 3 to about 4. In one embodiment, the polydispersity index can be about 3.5. In another embodiment, the polydispersity index can be about 3.9.

A table detailing the properties of exemplary propylene polymers useful for the preparation of the impact copolymer described herein can be found in Table 1. Composition I is a comparative sample. Each of samples I-VII is a propylene homopolymer.

TABLE 1

| Composition | % mm | % mmmm | Nm | Polydispersity Index | % XS |
|---|---|---|---|---|---|
| I | 95.17 | 93.1 | 70.6 | 3.50 | 2.53 |
| II | 94.94 | 92.86 | 72.1 | 3.50 | 2.55 |
| III | 95.07 | 92.76 | 68.9 | 3.50 | 2.53 |
| IV | 94.94 | 91.88 | 58.6 | 3.50 | 2.16 |
| V | 95.39 | 93.65 | 79.3 | 3.70 | 1.91 |
| VI | 96.11 | 94.42 | 90.2 | 3.50 | 1.50 |
| VII | 96.68 | 95.33 | 112.2 | 3.90 | 1.61 |

In order to form an impact copolymer having the advantageous properties described herein, the above described propylene polymer is blended with an ethylene-propylene copolymer. The blending may take place via melt-blending in an extruder, however, more preferably, the propylene polymer and ethylene-propylene copolymer are blended via an in-reactor process.

The properties of the ethylene propylene copolymer, particularly for reactor blends, cannot be measured directly. As a result, the properties of the xylene solubles fraction of the composition, which comprises, amongst other components, the xylene soluble portion of the ethylene propylene copolymer, are reported herein. The xylene soluble fraction of the composition can comprise anywhere from about 5 to about 17 weight percent of the composition. In certain embodiments, however, the xylene soluble fraction can comprise from 8 to 13 weight percent of the composition. The weight percentage of the xylene solubles fraction in the composition may be measured according to the method described previously.

The xylene solubles fraction of the composition can contain about 20 to about 55 weight percent ethylene as measured by $^{13}$C NMR. In certain embodiments, however, the xylene solubles fraction of the composition may only contain about 32 to about 39 weight percent ethylene. In one embodiment, the ethylene content of the xylene solubles fraction of the composition can be about 36 weight percent. In another embodiment, the ethylene content can be about 36.7 weight percent. In another embodiment, the ethylene content in the xylene solubles fraction of the composition can be about 38 weight percent. In still another embodiment, the ethylene content can be about 38.7 weight percent.

The intrinsic viscosity of the xylene soluble fraction of the composition (β) can be from about 2 to about 7. In certain embodiments, β is from about 3 to about 5.

Properties of the Composition of the Invention

In one embodiment, the composition can have about 1.3 to about 19 weight percent total ethylene. In another embodiment, the composition can have about 3 to about 10 weight percent total ethylene. In an alternative embodiment, the total ethylene may be about 6 to about 8 weight percent total ethylene. In one embodiment, the composition can have about 6.5 weight percent total ethylene. In another embodiment, the composition can have about 7.4 weight percent total ethylene. Total ethylene content may be measured by FTIR according to ASTM D5576.

The composition of the invention can be further characterized by an intrinsic viscosity ratio of the xylene soluble fraction of the composition to the xylene insoluble fraction of the composition of about 1 to about 1.8. In other embodiments, the ratio may be about 1 to about 1.5. In a further embodiment, the ratio may be about 1.15 to 1.25. In certain embodiments, the intrinsic viscosity ratio of the xylene soluble fraction to the xylene insoluble fraction can be about 1.2. In another embodiment, the intrinsic viscosity ratio of the xylene soluble fraction to the xylene insoluble fraction may be about 1.5.

The intrinsic viscosity ratio of the xylene soluble fraction of the composition ("β") to the xylene insoluble fraction of the composition ("α") may be calculated according to the following formula:

$$\beta/\alpha = ([\eta/\alpha] - [A/100])/[B/100]$$

wherein "η" is the intrinsic viscosity of the composition; "A" is the weight percent of the xylene insoluble fraction of the composition and; "B" is the weight percent of the xylene soluble fraction of the composition. The intrinsic viscosity of the composition (η) and the xylene soluble fraction of the composition (β) are measured in tetralin at 140° C. using a Desreux-Bischoff dilution viscometer (Ubbelohde-type) viscometer on solutions with 1.5 g/l of polymer as described in U.S. Pat. No. 6,933,347.

The composition can be further characterized by a polydispersity index of from about 2.5 to about 4.5. In one embodiment, the polydispersity index can be about 3.3. In another embodiment, the polydispersity index can be about 3.8. In yet another embodiment, the polydispersity index can be about 3.9. Polydispersity may be measured according to the crossover modulus method described elsewhere herein.

The composition of the invention can have a percent crystallinity of at least 50 as measured by annealed differential scanning calorimetry (DSC) according to ASTM D3414. Following the general ASTM specification, films were pressed from pellets or powder at 200° C. for 3 min. These films were subsequently run in TA Q200 Robotics DSC with a refrigerated cooling system. In the DSC, polymer is melted at 200° C. and equilibrated for 5 minutes. The sample is then cooled to 0° C. at a rate of 10° C./min while recording the re-crystallization exotherm (cooling curve). Once cool, the sample is then heated to 200° C. at a rate of 15° C./min to record the melting endotherms. The percent crystallinity is determined by integrating the area under the re-crystallization peak on the cooling curve and dividing by 165 J/g.

In one embodiment, the percent crystallinity of the total polymer can be about 51. In another embodiment, the percent crystallinity of the total polymer can be about 51.5. In still another embodiment, the percent crystallinity of the total polymer can be about 51.6. In another embodiment, the percent crystallinity of the total polymer is about 54. In another embodiment, the percent crystallinity of the total polymer can be about 54.5. In yet another embodiment, the percent crystallinity of the total polymer can be about 54.8.

The composition of the invention can be further characterized by a melting temperature ("$T_{melt}$") of at least about 163° C. (DSC). In one embodiment, the $T_{melt}$ is about 163.9° C. In another embodiment, the $T_{melt}$ is about 164.5° C.

The composition of the invention can be further characterized by its melt flow. For example, for the preparation of non-pressure pipes, which are typically prepared via extrusion, the melt flow of the composition of the invention should be less than about 2, more preferably less than 1 g/10 minutes, but greater than about 0.1 g/10 minutes. In certain embodiments, the melt flow of the composition is between about 0.25 and 0.45 g/10 minutes. In other embodiments, the melt flow of the composition may be about 0.3 g/10 min or about 0.4 g/10 minutes. The melt flow of the composition of the invention may, however, exceed 2 but be less than about 20 g/10 min. At these higher melt flows, the composition can be useful for injection molding, thermoforming, or blow molding. The melt flow of the composition can be measured per ASTM 1238 using a load of 2.16 kg at 230° C.

In certain embodiments of the invention, the composition is nucleated with a nucleating agent such as Sodium 2,2'-methylene bis-(4,6-di-tert-butyl phenyl)phosphate. Other nucleating agents that can be used in a composition of the invention include, but are not limited to, talc, sodium benzoate, 2,2'-Methylenebis-(2,6-ditert-butylphenyl)phosphate (lithium salt), Aluminum hydroxybis[2,4,8,10-tetrakis(1,1-dimethylethyl)-6-hydroxy-12-H-dibenzo[d,g][1,3,2]dioxaphosphocin 6-oxidato], dibenzilidene sorbitol, nonitol 1,2,3-trideoxy-4,6:5,7-bis-O-[(4-propylphenyl)methylene], Cis-endo-bicyclo[2.2.1]heptane-2,3-dicarboxylic acid (disodium salt), 1R,2S-cyclohexanedicarboxylic acid (calcium salt), zinc stearate, pigments that act as nucleators, aromatic carboxylic acids, calcium carbonate, pimelic acid, calcium hydroxide, stearic acid, organic phosphates, and mixtures thereof.

In certain embodiments, fillers may be used in combination with, or instead of, nucleating agents. Examples of fillers include, but are not limited to, talc, micro-talc, glass, and nano-composites. In certain instances, fillers may act as nucleators.

Performance Characteristics

The resin described herein can have the performance characteristics disclosed in FIGS. 2, 3, and 4. In particular, the composition can have a 1% secant flexural modulus of at least about 160 to about 250 kpsi. In another embodiment, the flexural modulus can be about 170 to about 230 kpsi. Secant flexural modulus is measured according to ASTM D790. The Izod impact strength of the composition of the invention (according to ASTM D256) at room temperature can be 100% non-break. At −4° C., the Izod impact strength can be about 2 to about 6 ft-lb/in with partial breakage observed. At −20° C., the Izod impact strength can be about 1 to about 1.7 ft-lb/in, with complete breakage observed.

The yield stress of the composition, as measured according to ASTM D638, can be about 4000 to about 4500 psi. In certain embodiments, the yield stress of the composition can be about 4200 to about 4270 psi. The percent strain at the yield point can be from about 11 to about 13 percent. In certain embodiments, the percent strain at the yield point can be from about 11.5 to about 12.5 percent. In still other embodiments, the percent strain at the yield point can be from about 11.7 to about 12.1 percent.

The tangent tensile modulus of the composition can be about 170 kpsi to about 220 kpsi. In certain embodiments, the tangent tensile modulus of the composition can be about 180 kpsi to about 230 kpsi.

Long Term Creep

Figure 9:
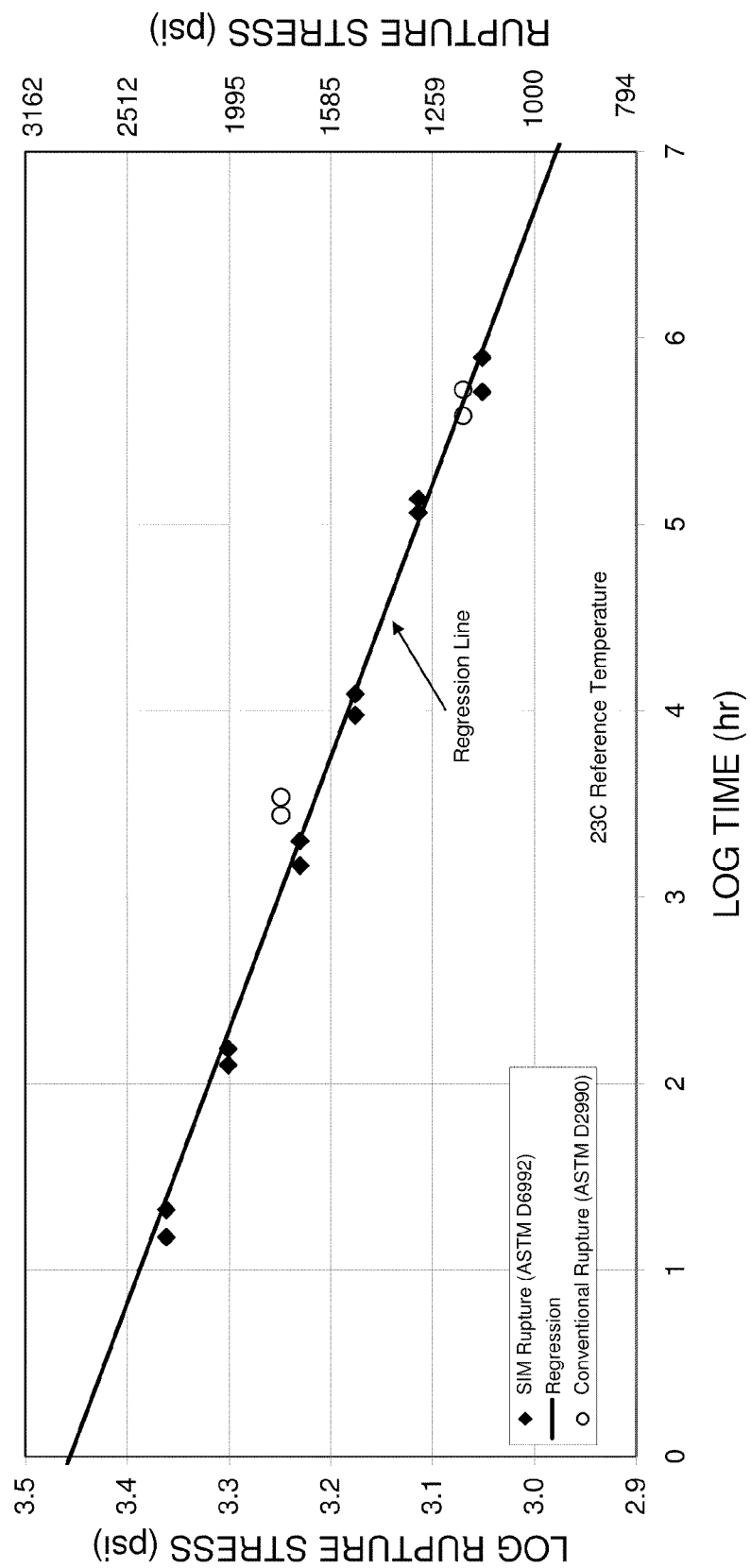
FIG. 9 is a graph showing the correlation between ASTM D6992 (SIM Creep Rupture) and ASTM 2990 (Conventional Creep Rupture) using composition XIII.

Long term creep properties can be measured using the Step Isothermal Method ("SIM") according to ASTM D6992 in the tensile mode of deformation using injection molded "Type 1" specimens. Type 1 specimens used for all SIM data measurements were prepared according to ASTM D4001 procedures. All data resulting from the various SIM creep studies was normalized to a reference temperature of 23° C. using the time-temperature superposition principle as described in ASTM D6992. Using these protocols, the creep-resistance of the composition can be evaluated at 50 and 100 years. All SIM data was validated with ASTM D2990, a conventional tensile creep-rupture measurement technique. FIG. 9 shows the correlation between SIM (ASTM 6992) and conventional creep rupture method (ASTM D2990) for composition XIII as described herein.

The 50 year creep modulus according to the SIM method at 500 psi can be at least about 24 kpsi. In certain embodiments, the 50 year creep modulus at 500 psi can be at least about 29 kpsi. In still other embodiments, the 50 year creep modulus at 500 psi can be at least about 34 kpsi.

The 50 year creep strain at 500 psi according to ASTM D6992 can be from about 1 to about 2.1%. In certain embodiments, the 50 year creep strain can be about 1.5 to about 1.7%. In yet other embodiments, the 50 year creep strain can be about 1.52 to about 1.72%.

The 50 year creep strain at 1000 psi, also according to D6992, can be less than about 8%. In another embodiment, the 50 year creep strain at 1000 psi can be less than about 7%. In another embodiment, the 50 year creep strain at 1000 psi can be less than about 5%.

The 50 year creep rupture strength can be at least about 1000 psi.

Instrumented Impact

Instrumented impact properties were measured according to ASTM D3763, using circular impact disks with a diameter of 4" and a thickness of 0.125". The disks were produced via injection molding according to ASTM D4001. A striker mass of 22.49 kg was used. Impact height was 0.3888 m and the impact velocity was 2.76 m/s.

Using the above described parameters, the total energy of the instrumented impact at −20° C. can be at least about 20 foot pounds. In other embodiments, the instrumented impact at −20° C. can be at least about 20 to about 45 foot-pounds. In other embodiments, the total energy at −20° C. can be at least about 24 to about 40 foot-pounds. In still other embodiments, the total energy at −20° C. can be at least about 30 to about 40 foot-pounds.

Figure 10:
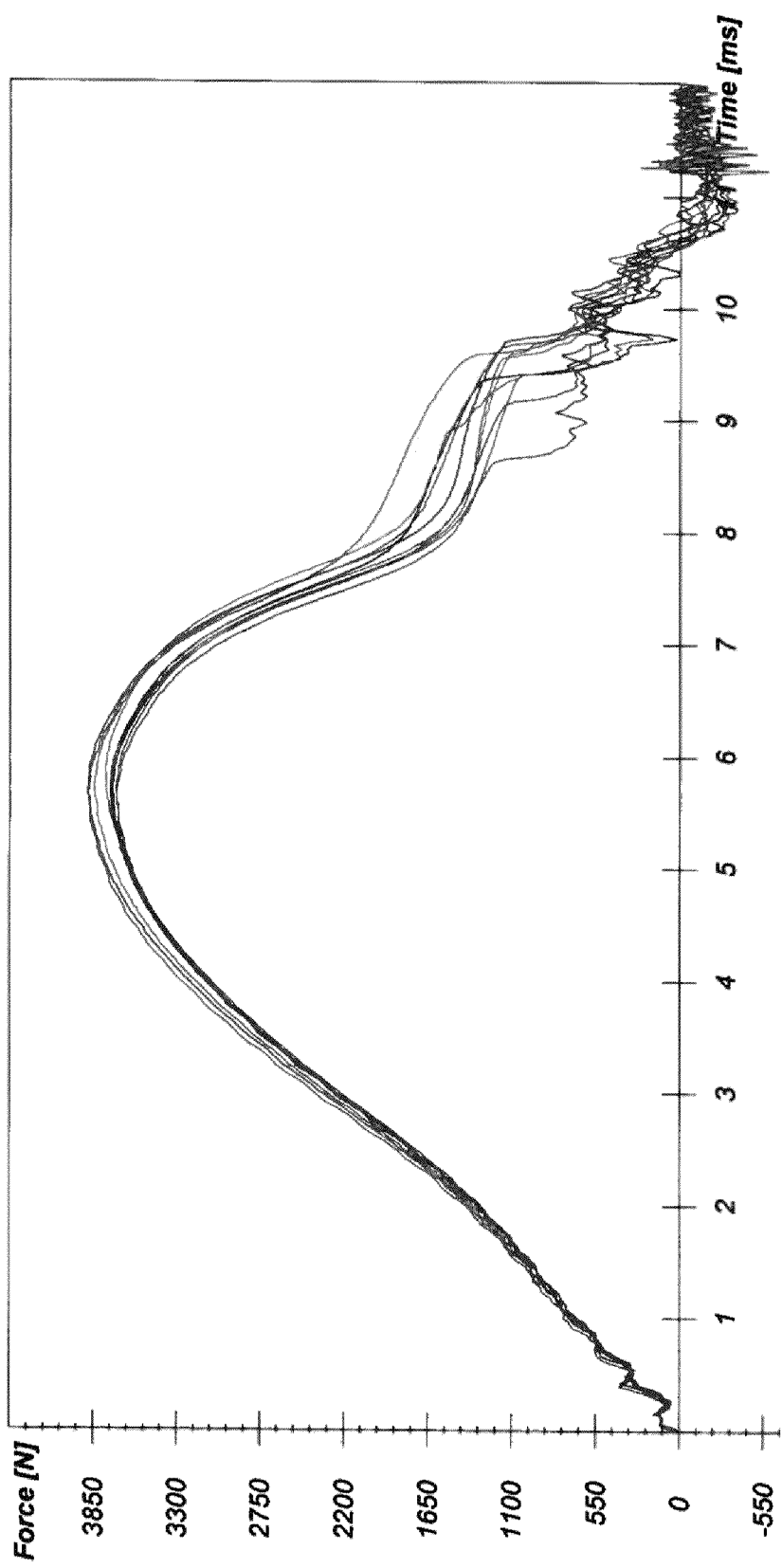
FIG. 10 is a graph showing representative profiles of instrumented impact energy at −20° C. for composition XIII.
Figure 11:
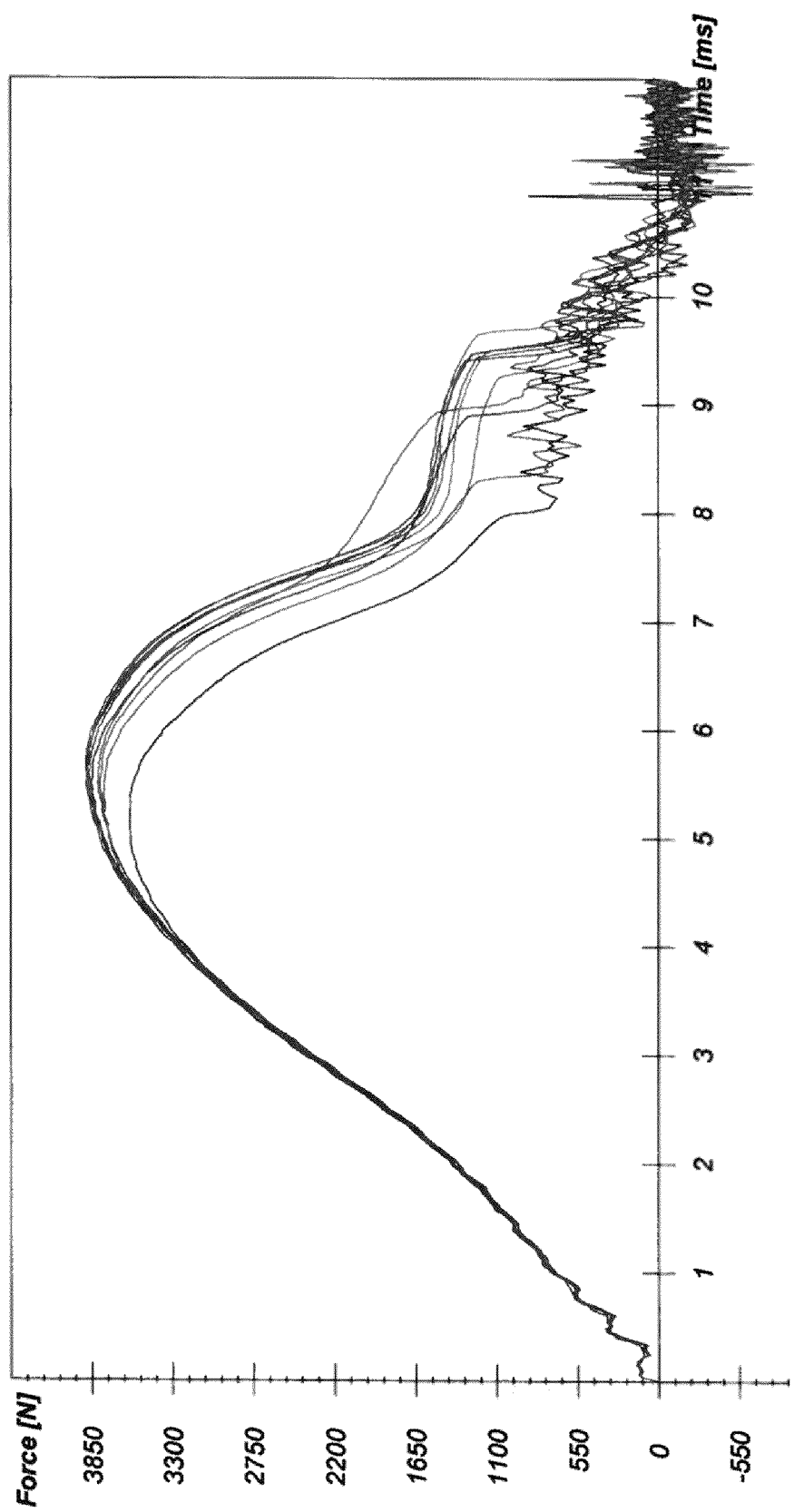
FIG. 11 is a graph showing representative profiles of instrumented impact energy at −20° C. for composition IX.
Figure 12:
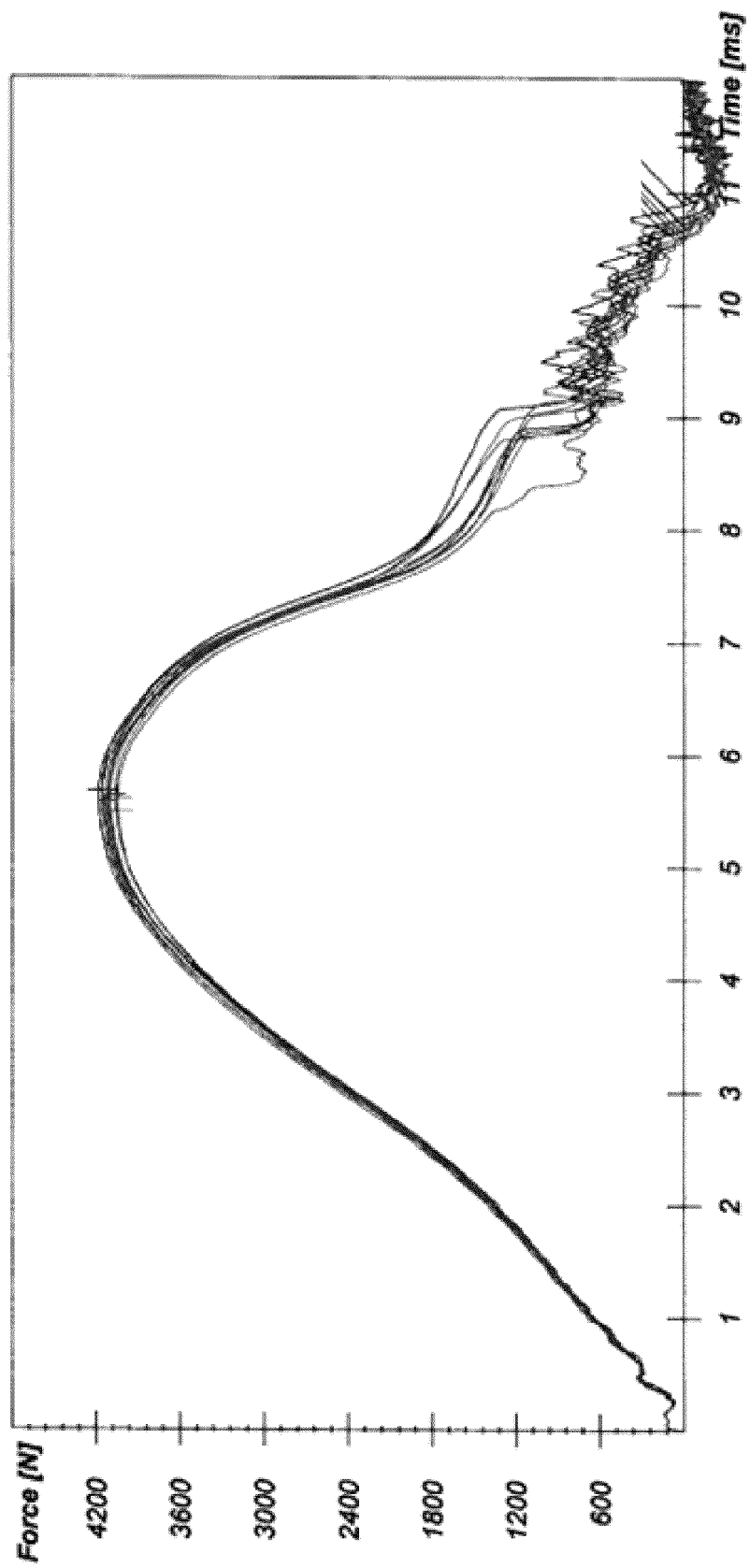
FIG. 12 is a graph showing representative profiles of instrumented impact energy at −29° C. for composition VIII.

The instrumented impact energy at maximum load at −20° C. can be at least about 20 foot-pounds. In other embodiments, the instrumented impact energy at maximum load at −20° C. can be at least about 21 foot-pounds. In still other embodiments, the instrumented impact energy at maximum load at −20° C. can be at least about 22 foot-pounds. Representative profiles of instrumented impact energy at maximum load at −20° C. for samples XIII, IX, and VIII are shown in FIGS. 10, 11, and 12 respectively. These figures show that the compounds of the invention retain their ductility, even at low temperature.

For instrumented impact at room temperature, the composition described herein can have a total energy of at least about 28 foot-pounds. The maximum load at room temperature can be at least about 550 foot-pounds. In other embodiments, the maximum load at room temperature can be at least about 560 foot-pounds. In other embodiments, the maximum load at room temperature may be at least about 575 foot-pounds.

The energy at maximum load at room temperature may be at least about 15 foot-pounds. In other embodiments, the energy at maximum load at room temperature may be at least about 15.5 foot-pounds. In yet another embodiment, the energy at maximum load at room temperature may be at least about 15.9 foot pounds.

Method of Making

The composition of the invention may be prepared according to procedures known in the art. More specifically, the composition of the invention may be prepared in a sequential polymerization process wherein a propylene polymer is prepared first, followed by the preparation of copolymer. The composition described herein can be prepared using a Ziegler-Natta catalyst, a co-catalyst such as triethylaluminum ("TEA"), and an electron donor such as dicyclopentyldimethoxysilane ("DPCMS"), cyclohexylmethyldimethoxysilane ("CMDMS"), diisopropyldimethoxysilane ("DIPDMS"), or other electron donor known in the art. The catalyst system is introduced at the beginning of the polymerization of the propylene polymer and is transferred with the product propylene polymer to the copolymerization reactor where it serves to catalyze the gas phase copolymerization of propylene and ethylene.

The propylene polymer may be prepared using at least one reactor or may be prepared using a plurality of parallel reactors or reactors in series. Preferably, the homopolymerization process utilizes one or two liquid filled loop reactors in series. Despite a preference for liquid filled loop reactors, the propylene polymer may also be prepared in a gas-phase reactor.

Once formation of the propylene polymer is complete, resulting in either a homopolymer or ethylene propylene random copolymer having less than 1.5 weight percent ethylene, the resultant powder is passed through a degassing vessel so that excess propylene and other gasses may be removed from the fresh resin. After degassing, the propylene polymer is passed to one or more gas phase reactors wherein propylene is copolymerized with ethylene in the presence of the propylene polymer previously produced and the catalyst transferred therewith.

Propylene polymer crystallinity and isotacticity can be controlled by the ratio of co-catalyst to electron donor. The appropriate ratio of co-catalyst to electron donor is dependent upon the catalyst and donor selected. It is within the skill of the ordinarily skilled artisan to determine the appropriate ratio to arrive at a product having the presently described properties.

The amount of hydrogen necessary to prepare the homopolymer component of the invention is dependent in large measure on the donor and catalyst system used. It is within the skill of the ordinary skilled artisan to select the appropriate quantity of hydrogen for a given catalyst/donor system to prepare a propylene polymer having the combination of properties disclosed herein without undue experimentation.

For copolymerization, the gas phase composition of the reactor(s) are maintained such that the ratio of the mols of ethylene in the gas phase to the total mols of ethylene and propylene is held constant. In certain embodiments, this ratio can be maintained at from about 0.3 to about 0.55. In other embodiments, this ratio can be maintained at about 0.45. In still other embodiments, the ratio of the mols of ethylene in the gas phase to the total mols of ethylene and propylene can be maintained at 0.43. In order to maintain the desired molar ratio, monomer feeds of propylene and ethylene are adjusted as appropriate.

Hydrogen can be added in the gas phase reactor(s) to control the molecular weight of the copolymer. The atmospheric composition of the gas phase is maintained such that the ratio of hydrogen to ethylene (mol/mol) is held constant. In certain embodiments, the ratio of hydrogen to ethylene is maintained at about 0.001 to about 0.03. In other embodiments, the ration of hydrogen to ethylene is maintained at 0.01 to about 0.03. In one embodiment, the ratio is about 0.01. In another embodiment, the ratio is about 0.025. In a further embodiment, the ratio is about 0.0015. Exemplary reactor conditions are described in Table 2.

TABLE 2

|  | Example 1 | Example 2 |
|---|---|---|
| Homopolymerization Reactor | | |
| Temperature (° C.) | 75 | 75 |
| Pressure (kg/cm$^2$) | 42 | 42 |
| TEA/Donor (wt/wt) | 6.5 | 6.3 |
| Hydrogen (ppm) | 210 | 400 |
| Copolymerization Reactor | | |
| Temperature (° C.) | 75 | 70 |
| Pressure (kg/cm$^2$) | 9.8 | 11.1 |
| C$_2$/C$_2$ + C$_3$ (mol/mol) | 0.43 | 0.43 |
| H$_2$/C$_2$ (mol/mol) | 0.01 | 0.025 |
| Product | | |
| MFR* (dg/min) | 0.35 | 0.34 |
| C$_2$ content (wt %) | 6.5 | 7.5 |

*ASTM D1238

Upon completion of the polymerization process, the polymer powder produced according to the above described procedure can be fed into an extruder. When an extruder is employed, typically, a twin screw extruder is preferred in order to obtain the best melt mixing and dispersion. Despite the preference for a twin-screw extruder, other extruders known in the art, such as a single screw extruder, may be used to achieve the desired melt mixing.

Additives including, but not limited to, antioxidants, acid scavengers, nucleators, antistatics, long term heat agents, slip agents, pigments, processing aids, fillers, polyethylene, impact modifiers, compatabilizers, as well as combinations of any of the aforementioned additives, may be added to the extruder to prepare compositions having specific properties. The extruded polymer strands are subsequently pelletized.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A polypropylene composition, said composition comprising about 83 to about 95 weight percent of a xylene insoluble fraction comprising a xylene insoluble portion of a propylene polymer, said propylene polymer having an mmmm of from about 88 to less than about 96 percent; an Nm of from about 55 to about 120; a xylene solubles content of from about 1 to about 5%; and a polydispersity index of 2.5 to 6; and about 5 to about 17 weight percent of a xylene soluble fraction comprising a xylene soluble portion of a copolymer of propylene and ethylene, said xylene soluble fraction having about 20 to about 55 weight percent ethylene; said composition having about 1.3 to about 19 weight percent total ethylene; a polydispersity index of from about 2.5 to about 4.5; and a 50-year creep strain of less than about 8% at 1000 psi at 23° C. without creep rupture.

2. The composition according to claim 1, wherein said xylene insoluble fraction has an mmmm of about 95, an Nm of about 112, and a polydispersity index of about 3.9; said xylene soluble fraction has about 38 to about 39 weight percent ethylene; and said composition has about 7 to about 8 weight percent total ethylene; and a polydispersity index of about 3.8 to about 3.9.

3. The composition according to claim 1, wherein the composition has a meltflow rate of less than about 20 g/10 min.

4. The composition according to claim 1, wherein the composition has a melt flow of less than about 1 g/10 min.

5. The composition according to claim 1, wherein said composition has a 1% secant flexular modulus of about 170,000 to about 230,000 psi.

6. The composition according to claim 1, wherein said composition has a 50-year creep modulus of at least about 24,000 psi at 23° C. and 500 psi.

7. The composition according to claim 1, wherein said composition has an intrinsic viscosity ratio of copolymer to propylene polymer of about 1 to about 1.8.

8. The composition according to claim 1, wherein said composition has a total energy during instrumented impact at −20° C. of at least about 20 foot pounds.

9. The composition according to claim 1, further comprising at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

10. Mono- or multi-layer pipes, pipe fittings, pipe junctions, tubes, or hoses comprising a polypropylene composition, said polypropylene composition comprising about 83 to about 95 weight percent of a xylene insoluble fraction comprising a xylene insoluble portion of a propylene polymer, said propylene polymer having an mmmm of from about 88 to less than about 96 percent; an Nm of from about 55 to about 120; a xylene solubles content of from about 1 to about 5%; and a polydispersity index of 2.5 to 6; and about 5 to about 17 weight percent of a xylene soluble fraction comprising a xylene soluble portion of a copolymer of propylene and ethylene, said xylene soluble fraction having about 20 to about 55 weight percent ethylene; said composition having about 1.3 to about 19 weight percent total ethylene; a polydispersity index of from about 2.5 to about 4.5; and a 50-year creep strain of less than about 8% at 1000 psi at 23° C. without creep rupture.

11. The mono- or multi-layer pipes, pipe fittings, pipe junctions, tubes, or hoses according to claim 10, wherein said propylene polymer has an mmmm of about 95, an Nm of about 112, and a polydispersity index of about 3.9; said xylene soluble fraction has about 38 to about 39 weight percent ethylene; and said composition has about 7 to about 8 weight percent total ethylene; and a polydispersity index of about 3.8 to about 3.9.

12. The mono- or multi-layer pipes, pipe fittings, pipe junctions, tubes, or hoses according to claim 10, wherein said composition has a 50-year creep modulus of at least about 24,000 psi at 23° C. and 500 psi.

13. The mono- or multi-layer pipes, pipe fittings, pipe junctions, tubes, or hoses according to claim 10, wherein said polypropylene composition has a 1% secant flexular modulus of about 170,000 to about 230,000 psi.

14. The mono- or multi-layer pipes, pipe fittings, pipe junctions, tubes, or hoses according to claim 10, wherein said polypropylene composition further comprises at least one additive selected from the group consisting of a nucleator, an acid scavenger, an antioxidant, a clarifier, a long term heat agent, a processing aid, a pigment, a filler, polyethylene, an impact modifier, a compatabilizer, and a slip agent.

15. The composition according to claim 10, wherein said composition has an intrinsic viscosity ratio of copolymer to homopolymer of about 1 to about 1.8.

16. An article comprising a composition of claim 1, wherein the article is prepared via extrusion, injection molding, compression molding, blow molding, or thermoforming.

* * * * *